US009688874B2

(12) United States Patent
Hsu et al.

(10) Patent No.: US 9,688,874 B2
(45) Date of Patent: Jun. 27, 2017

(54) METHOD OF MAKING A BICYCLIC GUANIDINE-CURED ACRYLIC COATING

(71) Applicant: PPG Industries Ohio, Inc., Cleveland, OH (US)

(72) Inventors: Lorraine Hsu, Pittsburgh, PA (US); David Stone, Pittsburgh, PA (US); Michael G. Sandala, Pittsburgh, PA (US); Kelly Moore, Dunbar, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 37 days.

(21) Appl. No.: 14/062,919

(22) Filed: Oct. 25, 2013

(65) Prior Publication Data
US 2015/0114839 A1 Apr. 30, 2015

(51) Int. Cl.
C09D 133/14 (2006.01)
C25D 9/02 (2006.01)
C09D 133/06 (2006.01)
C08K 5/31 (2006.01)
C25D 13/12 (2006.01)

(52) U.S. Cl.
CPC .............. *C09D 133/14* (2013.01); *C08K 5/31* (2013.01); *C09D 133/066* (2013.01); *C25D 9/02* (2013.01); *C25D 13/12* (2013.01)

(58) Field of Classification Search
CPC ........ C08L 33/00; C09D 133/14; C25D 13/06
See application file for complete search history.

(56) References Cited

U.S. PATENT DOCUMENTS

| | | | |
|---|---|---|---|
| 2,473,111 A | 6/1949 | Short et al. |
| 3,769,288 A | 10/1973 | Stähle et al. |
| 3,909,200 A | 9/1975 | Redmore |
| 3,945,961 A | 3/1976 | Blank |
| 4,297,255 A | 10/1981 | Schenck et al. |
| 4,546,165 A | 10/1985 | Grögler et al. |
| 4,559,180 A | 12/1985 | Green |
| 4,568,719 A | 2/1986 | Tada et al. |
| 4,617,281 A | 10/1986 | Green |
| 4,663,472 A | 5/1987 | Green |
| 4,757,116 A | 7/1988 | Greco et al. |
| 4,761,337 A | 8/1988 | Guagliardo et al. |
| 4,797,487 A | 1/1989 | A'Court |
| 4,869,772 A | 9/1989 | McDonnell et al. |
| 4,874,822 A | 10/1989 | Rasmussen et al. |
| 5,268,473 A | 12/1993 | Moren et al. |
| 5,506,279 A | 4/1996 | Babu et al. |
| 5,659,011 A | 8/1997 | Waldmann |
| 5,998,013 A | 12/1999 | Shoshi et al. |
| 6,057,034 A | 5/2000 | Yamazaki et al. |
| 6,075,065 A | 6/2000 | Yamazaki et al. |
| 6,245,922 B1 | 6/2001 | Heilmann et al. |
| 6,506,858 B1 | 1/2003 | Knuuttila et al. |
| 6,617,399 B2 | 9/2003 | Konarski |
| 6,635,690 B2 | 10/2003 | Heilmann et al. |
| 6,743,921 B2 | 6/2004 | Tucker et al. |
| 6,852,193 B2 | 2/2005 | Kneafsey et al. |
| 6,894,082 B2 | 5/2005 | Brantl et al. |
| 6,936,641 B2 | 8/2005 | Molock et al. |
| 7,012,120 B2 | 3/2006 | Klemarczyk et al. |
| 7,015,286 B2 | 3/2006 | Heilmann et al. |
| 7,074,858 B2 | 7/2006 | Heilmann et al. |
| 7,109,061 B2 | 9/2006 | Crane et al. |
| 7,211,616 B2 | 5/2007 | Kaszubski et al. |
| 7,384,984 B2 | 6/2008 | Lewandowski et al. |
| 7,842,762 B2 | 11/2010 | Zawacky et al. |
| 8,039,618 B2 | 10/2011 | Minch et al. |
| 8,148,490 B2 | 4/2012 | McCollum et al. |
| 8,288,504 B2 | 10/2012 | Zawacky et al. |
| 8,334,380 B2 | 12/2012 | Boyd et al. |
| 8,492,542 B2 | 7/2013 | Minch et al. |
| 8,563,560 B2 | 10/2013 | Hickenboth et al. |
| 8,884,059 B2 | 11/2014 | Zawacky et al. |
| 9,108,968 B2 | 8/2015 | Dacko et al. |
| 2003/0061825 A1 | 4/2003 | Sullivan |
| 2003/0092694 A1 | 5/2003 | Nilsson et al. |
| 2003/0164222 A1 | 9/2003 | Kneafsey et al. |
| 2003/0181318 A1 | 9/2003 | Tucker et al. |
| 2003/0185788 A1 | 10/2003 | Rothbard et al. |
| 2004/0059044 A1 | 3/2004 | Olson et al. |
| 2004/0063848 A1 | 4/2004 | Olson et al. |
| 2005/0182148 A1 | 8/2005 | Gaud et al. |
| 2005/0211580 A1 | 9/2005 | Kaszubski et al. |
| 2005/0288457 A1 | 12/2005 | Liu et al. |
| 2005/0288458 A1 | 12/2005 | Klemarczyk et al. |
| 2006/0004119 A1 | 1/2006 | Molock et al. |
| 2006/0046068 A1 | 3/2006 | Barancyk et al. |
| 2006/0068198 A1 | 3/2006 | Bratys et al. |
| 2006/0158001 A1 | 7/2006 | Emch et al. |
| 2006/0229419 A1 | 10/2006 | Eswarakrishnan et al. |
| 2006/0276461 A1 | 12/2006 | Old et al. |
| 2007/0048445 A1 | 3/2007 | DiMario |
| 2009/0042060 A1* | 2/2009 | Zawacky ............. C09D 5/4496 428/704 |

(Continued)

FOREIGN PATENT DOCUMENTS

DE 102006056311 A1 6/2008
EP 0152240 A2 8/1985

(Continued)

OTHER PUBLICATIONS

Bocharov, B. V., "Progress in the Chemistry of the Carbodimides", Mar. 1965, 212-219, Russian Chemical Reviews vol. 34 No. 3.

(Continued)

*Primary Examiner* — Wenwen Cai
(74) *Attorney, Agent, or Firm* — Charles M. Yeomans

(57) ABSTRACT

Disclosed are electrodepositable coating compositions that include a cationic amine salt group-containing (meth)acrylic polymer in which the (meth)acrylic polymer is prepared by polymerizing a mixture of ethylenically unsaturated monomers comprising at least 10% by weight of a (meth)acrylic monomer containing hydroxy ester groups, the % by weight being based on total weight of ethylenically unsaturated monomers, and an acid salt of a guanidine or a guanidine reaction product. Associated methods of preparing an amine salt group containing composition and for coating a substrate are also disclosed. Substrates coated with the electrodepositable coating composition are also disclosed.

14 Claims, No Drawings

(56) References Cited

U.S. PATENT DOCUMENTS

| | | | |
|---|---|---|---|
| 2009/0171025 | A1 | 7/2009 | Matsushita et al. |
| 2009/0281313 | A1 | 11/2009 | Minch et al. |
| 2009/0281314 | A1 | 11/2009 | Boyd et al. |
| 2009/0286978 | A1 | 11/2009 | Minch et al. |
| 2010/0294667 | A1* | 11/2010 | Polk .................. C09B 67/0013 205/50 |
| 2011/0224328 | A1 | 9/2011 | McCollum et al. |
| 2012/0220770 | A1 | 8/2012 | Hickenboth et al. |
| 2013/0289272 | A1 | 10/2013 | Dacko et al. |
| 2013/0289273 | A1 | 10/2013 | Dacko et al. |

FOREIGN PATENT DOCUMENTS

| | | |
|---|---|---|
| EP | 0198680 A1 | 10/1986 |
| EP | 0295930 A2 | 12/1988 |
| EP | 0380178 A2 | 8/1990 |
| EP | 0449488 A1 | 10/1991 |
| EP | 0554023 A1 | 8/1993 |
| EP | 0874012 A1 | 10/1998 |
| EP | 1788035 A1 | 5/2007 |
| JP | H02189330 A | 7/1990 |
| JP | 6033332 Y2 | 8/1994 |
| JP | H10265612 A | 10/1998 |
| JP | 11021352 A | 1/1999 |
| JP | 2000273280 A | 10/2000 |
| JP | 2006199721 A | 8/2006 |
| WO | 9705101 A1 | 2/1997 |
| WO | 0192434 A1 | 12/2001 |
| WO | 02102909 A1 | 12/2002 |
| WO | 2007037484 A1 | 4/2007 |
| WO | 2009021095 A1 | 2/2009 |
| WO | 2009027186 A2 | 3/2009 |
| WO | 2009137728 A2 | 11/2009 |
| WO | 2011079041 A1 | 6/2011 |
| WO | 2011112594 A1 | 9/2011 |

OTHER PUBLICATIONS

Cotton, F. A. et al, "Homologues of the Easily Ionized Compound Mo2(hpp)4 Containing Smaller Bicyclic Guanidinates", Article, Mar. 15, 2006, 5493-550, Inorganic Chemistry vol. 45, American Chemical Society, College Station, Texas.

Davis, T. L. et al, "The Urea Dearrangement. II", Jul. 1923, 1816-1820, vol. 45, Cambridge, Massachusetts.

Dovlatyan, V. V. et al, "Reactions of Derivatives of Amino- and Mercapto- sym-Triazines with Ethyleneimine and Ethylenediamine", Article, Jun. 1993, 704-707, Armenian Agricultural Institute.

Echavarren, A. et al, "Anion-Receptor Molecules: Synthesis of a Chiral and Functionalized Binding Subunit, a Bicyclic Guanidinium Group Derived from L- or D-Asparagine", 1988, 685-693, Helvetica Chimica Acta vol. 71, Madrid, Spain.

Edwards, P., "Nonsymmetrical Cyclic Urea Inhibitors of HIV-1 Aspartic Protease", Jun. 2006, 569-570, Drug Discovery Today vol. 11, Elsevier Ltd.

Gelbard, G. et al, "Polynitrogen Strong Bases: 1—New Syntheses of Biguanides and their Catalytic Properties in Transesterification Reactions", Feb. 1998, 2743-2746, Tetrahedron Letters 39, Elsevier Science Ltd.

Han, C. et al, "Synthesis of Carbamates and Ureas Using Zr(IV)-Catalyzed Exchange Processes", Feb. 2007, 1517-1520, Organic Letters vol. 9. No. 8, American Chemical Society.

Hövelmann, C. H., et al, "Direct Synthesis of Bicyclic Guanidines Through Unprecedented Palladium (II) Catalysed Diamination with Copper Chloride as Oxidant", Feb. 2008, 2334-2336, Chem. Commun., The Royal Society of Chemistry.

Juaristl, E., et al, "Synthesis of New Chiral Derivatives of N,N'-Dimethylpropyleneurea (DMPU) and Examination of Their Influence on the Regio- and Enantioselectivity of Addition of 2-(1,3-Dithianyl)lithium to Cyclohex-2-en-1-one", 2002, 1999-2008, Helvetica Chimica Acta vol. 85.

Kurihara, M., et al, "Design and Synthesis of Cyclic Urea Compounds: A Pharmacological Study for Retinoidal Activity", Jun. 2004, 4131-4134, Bioorg. Med. Chem. Lett. 14, Elsevier Ltd.

Margetića, D., et al, "Reactions of Dimethyl Carbonate with Aliphatic Amines Under High Pressure", journal, May 2011, 2283-2289, Synthetic Communications vol. 41, Issue 15, Taylor a& Francis Group, LLC.

McKay, A. F., et al, "Influence of Steric and Polar Effects on Base Strengths of Bicyclic Guanidines", Mar. 1962, 1159-1163, Canadian Journal of Chemistry, vol. 40.

Rao, A. V. R., et al, "Synthesis of New Bicyclic Guanidine Heterocycle as a Potential Anti HIV Agent", 1993, 4993-4996, Tetrahedron Letters vol. 34 No. 31, Pergamon Press Ltd., Great Britain.

Schmidtchen, F. P., "Synthese Symmetrisch Substituierter Bicyclischer Guanidine", 1980, 2175-2182, Chem. Ber. 113, Verlag Chemie (no translation available).

Shen, H., et al, "Ti-amide Catalyzed Synthesis of Cyclic Guanidines from Di-/Triamines and Carbodiimides", Jun. 2011, 4562-4565, Organic Letters vol. 13 No. 17, American Chemical Society.

Shen, J. et al, "Chiral Bicyclic Guanidine-Catalyzed Enantioselective Reactions of Anthrones", Jun. 2006, 13692-13693, J. Am. Chem. Soc. vol. 128 No. 42, JACS Communications.

Simoni, D., et al, "Strong Bicyclis Guanidine Base-Promoted Wittig and Horner-Wadsworth-Emmons Reactions", Letter, 2000, 3765-3768, Org. Lett. 2, American Chemical Society (abstract only).

Shestakov, A. S., et al, "Reaction of Cyanamides with N,N-Binucleophiles", Apr. 2006, 1647-1652, Russian Journal of General Chemistry vol. 76 No. 10, Pleiades Publishing, Inc.

Ulrich, H., et al, "Macrocyclic Ureas as Masked Isocyanates", 1978, 1544-1546, J. Org. Chem. vol. 43 No. 8, American Chemical Society.

You, Z., et al, "New AZT Conjugates as Potent Anti-HIV Agents", 2006, 37-54, Nucleosides, Nucleotides, and Nucleic Acids vol. 25, Taylor & Francis Group, LLC.

* cited by examiner

# METHOD OF MAKING A BICYCLIC GUANIDINE-CURED ACRYLIC COATING

FIELD

An electrodepositable coating composition comprising cyclic guanidine and a method for producing cyclic guanidine are disclosed.

BACKGROUND

Cyclic guanidines, such as 1,5,7-triazabicyclo[4.4.0]dec-5-ene (TBD), have chemical activities which make them valuable catalysts for the cure of hydroxy-containing acrylics via transesterification without the use of traditional cross-linkers such as isocyanates and melamines. However, because cyclic guanidines are a non-latent catalyst, incorporation of cyclic guanidine into acrylic resins has been limited to post-resin addition at lower, non-reactive temperatures under inert atmospheric conditions in order to avoid gelation that results when bicyclic guanidine is added to the resin during synthesis. Therefore, a cyclic guanidine that can be added during the synthesis of acrylics without reaction at polymerization temperatures is desired.

SUMMARY

In an embodiment, an electrodepositable coating composition is disclosed, the coating composition comprising: (a) a cationic amine salt group-containing (meth)acrylic polymer in which the (meth)acrylic polymer is prepared by polymerizing a mixture of ethylenically unsaturated monomers comprising at least 10% by weight of a (meth)acrylic monomer containing hydroxy ester groups, the % by weight being based on total weight of ethylenically unsaturated monomers; and (b) an acid salt of a guanidine or a guanidine reaction product.

In another embodiment, a method of preparing an amine salt group-containing composition is disclosed, the method comprising: (a) providing a (meth)acrylic group-containing polymer containing amino groups prepared from polymerizing a mixture of ethylenically unsaturated monomers comprising at least 10% by weight of a (meth)acrylic monomer containing hydroxy ester groups, the % by weight being based on total weight of ethylenically unsaturated monomers; (b) providing a guanidine or a guanidine reaction product or the amine salt thereof; (c) mixing (a) with (b) to form a mixture; and (d) acidifying the mixture.

In another embodiment, a method for coating a substrate is disclosed, the method comprising: (a) introducing the substrate serving as a cathode into an electrodeposition bath comprising an aqueous dispersion of the disclosed electrodepositable composition; (b) electrodepositing the electrodepositable composition onto the surface of the substrate to form a coated layer on the substrate surface; and (c) heating the coated layer to form a cured coating.

A substrate coated by the method for coating is also disclosed.

DETAILED DESCRIPTION

As used herein, unless otherwise expressly specified, all numbers such as those expressing values, ranges, amounts or percentages may be read as if prefaced by the word "about", even if the term does not expressly appear. When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10. As employed herein, the term "number" means one or an integer greater than one.

As used herein, plural phrases or terms encompasses their singular counterparts and vice versa, unless specifically stated otherwise. By way of illustration, and not limitation, although reference is made herein to "a" cyanamide, "an" amine, "a" polyamine; "an" epoxy compound; a plurality of these materials may be used in the present invention. As used herein, "plurality" means two or more.

As used herein, "includes" and like terms means "including without limitation."

As used herein, the use of "or" means "and/or" unless specifically stated otherwise, even though "and/or" may be explicitly used in certain instances.

As used herein, "molecular weight" means weight average molecular weight (Mw) as determined by Gel Permeation Chromatography.

As used herein, the term "cure" refers to a process wherein the crosslinkable components of a coating are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form a compound, the compound will comprise the residues of such monomer components. Reference to polymer includes copolymers of two or more monomers. (Meth)acrylate includes both acrylate and methacrylate monomers.

As stated above, the present disclosure is directed to an electrodepositable coating composition comprising (a) a cationic amine salt group-containing (meth)acrylic polymer in which the (meth)acrylic polymer is prepared by polymerizing a mixture of ethylenically unsaturated monomers comprising at least 10% by weight of a (meth)acrylic monomer containing hydroxy ester groups, the % by weight being based on total weight of ethylenically unsaturated monomers; and (b) an acid salt of a guanidine or a guanidine reaction product.

Suitable active hydrogen-containing, cationic salt group-containing resins can include copolymers of one or more alkyl esters of (meth)acrylic acid optionally together with one or more other polymerizable ethylenically unsaturated monomers. Suitable alkyl esters of (meth)acrylic acid include methyl (meth)acrylate, ethyl (meth)acrylate, butyl (meth)acrylate, and 2-ethyl hexyl acrylate. Suitable other copolymerizable ethylenically unsaturated monomers include nitriles such acrylonitrile and (meth)acrylonitrile, vinyl and vinylidene halides such as vinyl chloride and vinylidene fluoride and vinyl esters such as vinyl acetate. Acid and anhydride functional ethylenically unsaturated monomers such as acrylic acid, (meth)acrylic acid or anhydride, itaconic acid, maleic acid or anhydride, or fumaric acid may be used. Amide functional monomers including acrylamide, (meth)acrylamide, and N-alkyl substituted (meth)acrylamides are also suitable. Vinyl aromatic compounds such as styrene and vinyl toluene can be used so long as a high level of photodegradation resistance of the polymer is not required.

Functional groups such as hydroxyl and amino groups can be incorporated into the acrylic polymer by using functional monomers such as hydroxyalkyl methacrylates or aminoalkyl (meth)acrylates. The (meth)acrylic polymer may comprise at least 10% by weight of (meth)acrylic monomers containing hydroxy alkyl groups such as β-hydroxyl groups, γ-hydroxyl groups, or mixtures thereof, the % by weight based on the total weight of ethylenically unsaturated monomers.

In embodiments, the (meth)acrylic polymer has a $M_w$ from 5,000 to 100,000, such as from 10,000 to 50,000.

Epoxide functional groups (for conversion to cationic salt groups) may be incorporated into the acrylic polymer by using functional monomers such as glycidyl (meth)acrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting carboxyl groups on the acrylic polymer with an epihalohydrin or dihalohydrin such as epichlorohydrin or dichlorohydrin. In an embodiment, the mixture of ethylenically unsaturated monomers may comprise at least 2% of a 1,2-epoxy group-containing monomer, such as at least 7%. In an embodiment, the mixture of ethylenically unsaturated monomers may comprise no more than 25% of a 1,2-epoxy group-containing monomer, such as no more than 20%.

The (meth)acrylic polymer can be prepared by traditional free radical initiated polymerization techniques, such as solution or emulsion polymerization, as known in the art, using suitable catalysts which include organic peroxides and azo type compounds and optionally chain transfer agents such as alpha-methyl styrene dimer and tertiary dodecyl mercaptan.

To form cationic salt groups, the epoxy-containing (meth) acrylate polymer is reacted with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines, hydroxyl-containing amines, polyamines, or combinations thereof may be used.

Tertiary and secondary amines are used more often than primary amines because primary amines are polyfunctional with respect to epoxy groups and have a greater tendency to gel the reaction mixture. If polyamines or primary amines are used, they can be used in a substantial stoichiometric excess to the epoxy functionality in the polyepoxide so as to prevent gelation and the excess amine can be removed from the reaction mixture by vacuum stripping or other technique at the end of the reaction. The epoxy may be added to the amine to ensure excess amine.

Examples of hydroxyl-containing amines include, but are not limited to, alkanolamines, dialkanolamines, alkyl alkanolamines, and aralkyl alkanolamines containing from 1 to 18 carbon atoms, such as 1 to 6 carbon atoms, in each of the alkanol, alkyl and aryl groups. Specific examples include ethanolamine, N-methylethanolamine, diethanolamine, N-phenylethanolamine, N,N-dimethylethanolamine, N-methyldiethanolamine, 3-aminopropyldiethanolamine, and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine, 3-dimethylaminopropylamine, and N,N-dimethylcyclohexylamine.

Mixtures of the above mentioned amines may also be used in the present invention.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature ranging from 50° C. to 150° C. may be done to hasten the reaction.

The reaction product of the primary and/or secondary amine and the polyepoxide is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

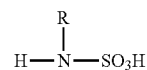

wherein R is hydrogen or an alkyl group having 1 to 4 carbon atoms.

It is noted that mixtures of the above mentioned acids may also be used may be used in the present invention.

The extent of neutralization of the cationic electrodepositable coating composition varies with the particular reaction product involved. However, sufficient acid should be used to disperse the electrodepositable coating composition in water. Typically, the amount of acid used provides at least 20 percent of all of the total neutralization. Excess acid may also be used beyond the amount required for 100 percent total neutralization. For example, in some embodiments, the amount of acid used to neutralize the electrodepositable coating composition is ≥0.1% based on the total amines in the electrodepositable coating composition. In other embodiments, the amount of acid used to neutralize the electrodepositable coating composition is ≤100% based on the total amines in the electrodepositable coating composition. In certain embodiments, the total amount of acid used to neutralize the electrodepositable coating composition ranges between any combination of values, which were recited in the preceding sentences, inclusive of the recited values. For example, the total amount of acid used to neutralize the electrodepositable coating composition can be 20%, 35%, 50%, 60%, or 80% based on the total amines in the electrodepositable coating composition.

Besides the amino group containing (meth)acrylic polymers described above amino group containing acrylic polymer containing amine functionality can be prepared using a (meth)acrylic monomer containing amino groups. Such polymers are described in U.S. Pat. Nos. 3,793,278 and 3,959,106.

The electrodepositable coating composition further comprises (b) an acid salt of a guanidine or a guanidine reaction product. It will be understood that "guanidine," as used herein, refers to a compound, moiety, and/or residue having the following general structure:

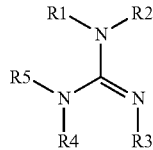

(I)

wherein each of R1, R2, R3, R4, R5 (i.e., substituents of structure (I)) can comprise hydrogen, (cyclo)alkyl, aryl, aromatic, organometallic, a polymeric structure, or together can form a cycloalkyl, aryl, or an aromatic structure, and wherein R1, R2, R3, R4, and R5 can be the same or different. As used herein, "(cyclo)alkyl" refers to both alkyl and cycloalkyl. When any of the R groups "together can form a (cyclo)alkyl, aryl, and/or aromatic group" it is meant that any two adjacent R groups are connected to form a cyclic moiety, such as the rings in structures (II)-(V) below.

It will be appreciated that in some embodiments, the double bond between the carbon atom and the nitrogen atom that is depicted in structure (I) may be located between the carbon atom and another nitrogen atom of structure (I). Accordingly, the various substituents of structure (I) may be attached to different nitrogens depending on where the double bond is located within the structure.

As mentioned above, the electrodepositable coating composition further comprises (b) an acid salt of a guanidine or a guanidine reaction product. In certain embodiments, the guanidine may comprise the guanidine of structure (I) wherein two or more R groups of structure (I) together form one or more rings. In other words, in some embodiments the cyclic guanidine may comprise ≥1 ring. For example, the cyclic guanidine can either be a monocyclic guanidine (1 ring) as depicted in structures (II) and/or (III) below, or the cyclic guanidine can be polycyclic (≥2 rings) as depicted in structures (IV) and (V) below.

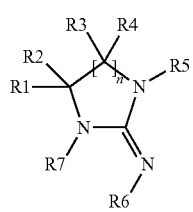

(II)

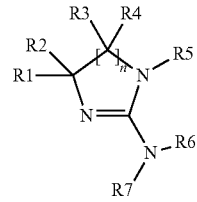

(III)

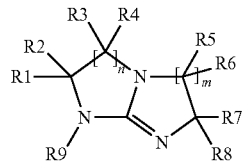

(IV)

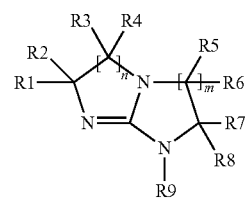

(V)

Each substituent of structures (II) and/or (III), R1-R7, can comprise hydrogen, (cyclo)alkyl, aryl, aromatic, organometallic, a polymeric structure, or together can form a cycloalkyl, aryl, or an aromatic structure, and wherein R1-R7 can be the same or different. Similarly, each substituent of structures (IV) and (V), R1-R9, can be hydrogen, alkyl, aryl, aromatic, organometallic, a polymeric structure, or together can form a cycloalkyl, aryl, or an aromatic structure, and wherein R1-R9 can be the same or different. Moreover, in some embodiments of structures (II) and/or (III), certain combinations of R1-R7 may be part of the same ring structure. For example, R1 and R7 of structure (II) may form part of a single ring structure. Moreover, in some embodiments, it will be understood that any combination of substituents (R1-R7 of structures (II) and/or (III) as well as R1-R9 of structures (IV) and/or (V)) can be chosen so long as the substituents do not substantially interfere with the catalytic activity of the cyclic guanidine.

In certain embodiments, each ring in the cyclic guanidine may be comprised of ≥5 members. For instance, the cyclic guanidine may be a 5-member ring, a 6-member ring, or a 7-member ring. As used herein, the term "member" refers to an atom located in a ring structure. Accordingly, a 5-member ring will have 5 atoms in the ring structure ("n" and/or "m"=1 in structures (II)-(V)), a 6-member ring will have 6 atoms in the ring structure ("n" and/or "m"=2 in structures (II)-(V)), and a 7-member ring will have 7 atoms in the ring structure ("n" and/or "m"=3 in structures (II)-(V)). It will be appreciated that if the cyclic guanidine is comprised of ≥2 rings (e.g., structures (IV) and (V)), the number of members in each ring of the cyclic guanidine can either be the same or different. For example, one ring may be a five-member ring while the other ring may be a six-member ring. If the cyclic guanidine is comprised of ≥3 rings, then in addition to the combinations cited in the preceding sentence, the number of members in a first ring of the cyclic guanidine can be different from the number of members in any other ring of the cyclic guanidine.

It will also be understood that in certain embodiments of the cyclic guanidine the nitrogen atoms of structures (II)-(V) can further have additional atoms attached thereto. Moreover, in some embodiments, the cyclic guanidine can either be substituted or unsubstituted. For example, as used herein in conjunction with the cyclic guanidine, "substituted", in certain embodiments, refers to a cyclic guanidine wherein R5, R6, and/or R7 of structures (II) and/or (III) and/or R9 of structures (IV) and/or (V) is not hydrogen. As used herein in conjunction with the cyclic guanidine, "unsubstituted", in certain embodiments, refers to a cyclic guanidine wherein R1-R7 of structures (II) and/or (III) and/or R1-R9 of structures (IV) and/or (V) is hydrogen. In some embodiments, the substituted cyclic guanidine is 1,5,7-triazabicyclo [04.4.0] dec-5-ene (TBD).

In some embodiments, the cyclic guanidine that is described in the preceding paragraphs may be reacted with a polyepoxide to form a reaction product. In certain embodiments, the polyepoxide typically has at least two 1,2-epoxy groups. The epoxy compounds may be saturated or unsaturated, cyclic or acyclic, aliphatic, alicyclic, aromatic or heterocyclic. Moreover, the epoxy compounds may contain substituents such as halogen, hydroxyl, and ether groups.

Examples of polyepoxides are those having a 1,2-epoxy equivalency greater than one and/or two; that is, polyepoxides which have on average two epoxide groups per molecule. Suitable polyepoxides include polyglycidyl ethers of polyhydric alcohols such as cyclic polyols and polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as hydrogenated bisphenol A, 1,2-cyclohexane diol and 1,2-bis(hydroxymethyl)cyclohexane.

In certain embodiments, the polyepoxides have epoxide equivalent weights ≥180. In some embodiments, the polyepoxides have epoxide equivalent weights ≤2000. In other embodiments, the polyepoxides have epoxide equivalent weights that range between any combination of values, which were recited in the preceding sentences, inclusive of the recited values. For example, in certain embodiments the polyepoxides have epoxide equivalent weights ranges from 186 to 1200.

The guanidine or guanidine reaction product described above may be at least partially neutralized with an acid (acidified). Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

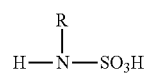

wherein R is hydrogen or an alkyl group having 1 to 4 carbon atoms.

It is noted that mixtures of the above mentioned acids may also be used may be used in the present invention.

The extent of neutralization of the guanidine or guanidine reaction product varies with the particular guanidine or guanidine reaction product involved. However, sufficient acid should be used to disperse the electrodepositable coating composition in water. Typically, the amount of acid used provides at least 20 percent of all of the total neutralization. Excess acid may also be used beyond the amount required for 100 percent total neutralization. For example, in some embodiments, the amount of acid used to neutralize the guanidine or guanidine reaction product is ≥0.1% based on the total amines in the electrodepositable coating composition. In other embodiments, the amount of acid used to neutralize the electrodepositable coating composition is ≤100% based on the total amines in the electrodepositable coating composition. In certain embodiments, the total amount of acid used to neutralize the electrodepositable coating composition ranges between any combination of values, which were recited in the preceding sentences, inclusive of the recited values. For example, the total amount of acid used to neutralize the electrodepositable coating composition can be 20%, 35%, 50%, 60%, or 80% based on the total amines in the electrodepositable coating composition.

In some embodiments, the electrodepositable coating composition comprises ≥0.01% or ≥0.2% by weight of the cyclic guanidine, such as 0.01 to 20% by weight, based on the total weight of the resin solids of the electrodepositable coating composition. In certain embodiments, the amount of cyclic guanidine present in the electrodepositable coating composition can range between any combination of values, which were recited in the preceding sentences, inclusive of the recited values. For example, in certain embodiments, the electrodepositable coating composition comprises 0.6% to 2.0% by weight of the cyclic guanidine, based on the total weight of the resin solids of the electrodepositable coating composition.

The acidified guanidine or guanidine reaction product can be incorporated into the electrodepositable coating composition during the synthesis of the (meth)acrylic polymer. In the acidified form the guanidine or guanidine reaction product is not catalytically active. However, after the coating composition is electrodeposited and the coating is cured at elevated temperature, the acid volatilizes, exposing the guanidine that catalyzes the (meth)acrylic polymer via a transesterification curing mechanism. Typically an epoxy-containing (meth)acrylic polymer is prepared in the presence of the acidified guanidine, reacted with an amine and the mixture acidified to form the cationic amine salt group-containing polymer. Alternatively, the cationic (meth)acrylic polymer can be prepared and combined with the acidified guanidine and the mixture is stable in this form. Catalysis occurs after the mixture is deposited as a coating and exposed to elevated temperature.

Electrodeposition baths are typically supplied as two components: (i) a main vehicle and (ii) a pigment paste. The first component (main vehicle) can be an unpigmented resin feed which may comprise (a) a main film-forming polymer (e.g., an active hydrogen-containing cationic salt group-containing resin) having reactive functional groups (e.g., hydroxyl ester groups for transesterification cure), and (b) any additional water-dispersible non-pigmented components. As used herein, "water dispersible" will mean that a material is adapted to be solubilized, dispersed, and/or emulsified in water. The main film-forming polymers used in the invention are cationic in nature. Accordingly, in some embodiments, the main film-forming polymer is cationic. In other words, the main film-forming polymer comprises cationic salt groups, generally prepared by neutralizing a functional group on the film-forming polymer with an acid, which enables the main film-forming polymer to be electrodeposited onto a cathode.

Main film-forming polymers suitable for use in the electrodepositable coating composition are the cationic amine salt group containing (meth)acrylic polymers, including cationic polymers derived from a polyepoxide.

The extent of cationic salt group formation should be such that when the resin is mixed with an aqueous medium and other ingredients, a stable dispersion of the electrodepositable coating composition will form. By "stable dispersion" is meant one that does not settle or is easily redispersible if some settling occurs. Moreover, the dispersion should be of sufficient cationic character that the dispersed resin particles will electrodeposit on a cathode when an electrical potential is set up between an anode and a cathode immersed in the aqueous dispersion.

In certain embodiments, the main film-forming polymer in the electrodepositable coating composition of the present invention comprises ≥0.1 milliequivalents of cationic salt group per gram of resin solids. In other embodiments, the main film-forming polymer comprises ≤3.0 milliequivalents of cationic salt group per gram of resin solids. In some embodiments, the milliequivalents of cationic salt group per gram of resin solids in the main film-forming polymer ranges between any combination of values, which were recited in the preceding sentences, inclusive of the recited values. For example, in some embodiments, the electrodepositable coating composition comprises from 0.1 to 0.7 milliequivalents of cationic salt group per gram of resin solids.

In certain embodiments, the main film-forming polymer is present in the electrodepositable coating composition in an amount ≥40% by weight based on weight of total resin solids present in the electrodepositable coating composition. In other embodiments, the main film-forming polymer is present the electrodepositable coating composition in an amount ≤80% by weight based on weight of total resin solids present in the electrodepositable coating composition. In some embodiments, the weight percent of the main film-forming polymer in the electrodepositable coating composition ranges between any combination of values, which were recited in the preceding sentences, inclusive of the recited values. For example, the main film-forming polymer is present in the electrodepositable coating composition in an amount ranging from 50% to 75% by weight based on weight of total resin solids present in the electrodepositable coating composition.

The second component of an electrodeposition bath generally comprises a pigment paste that can have one or more pigments, a water dispersible polymer (grind vehicle), and, optionally, additives such as surfactants, wetting agents, catalysts, dispersing aids, or combinations thereof. It should be noted that the water dispersible polymer of the grind vehicle can either be the same or different from the main film-forming polymer in the resin blend. The pigment composition used in the grind vehicle may be of the conventional type comprising pigments of, for example, iron oxides, strontium chromate, carbon black, coal dust, titanium dioxide, talc, barium sulfate, as well as color pigments such as cadmium yellow, cadmium red, chromium yellow and the like. In some embodiments, the pigment composition can comprise effect pigments such as, but not limited to, electroconductive and/or photo chromic pigments. The pigment content of the dispersion is usually expressed as a pigment-to-resin ratio. In the practice of the invention, when pigment is employed, the pigment-to-resin ratio is usually within the range of about 0.02:1 to 1:1. The other additives mentioned above are usually in the dispersion in amounts of about 0.01% to 3% by weight based on weight of resin solids.

The first and second components of the electrodeposition bath are dispersed together in an aqueous medium which comprises water and, usually, coalescing solvents to form the electrodeposition bath. Useful coalescing solvents that can be used in the electrodeposition bath include, but are not limited to, hydrocarbons, alcohols, esters, ethers and/or ketones. In one embodiment, the coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. In certain embodiments, the amount of coalescing solvent used in the electrodeposition bath is ≥0.01% weight based on the total weight of the aqueous medium used to make the electrodeposition bath. In other embodiments, the amount of coalescing solvent used in the electrodeposition bath is ≤25% by weight based on the total weight of the aqueous medium used to make the electrodeposition bath. In yet other embodiments, the amount of coalescing solvent used in the electrodeposition bath can range between any combination of values, which were recited in the preceding sentences, inclusive of the recited values. For example, in one embodiment, the amount of coalescing solvent used in the electrodeposition bath can range from 0.05% to 5% by weight based on the total weight of the aqueous medium used to make the electrodeposition bath.

Method of Making an Amine Salt Group-Containing Composition

In an embodiment, a method of making an amine salt group-containing composition is disclosed. In certain embodiments, the method comprises: (a) providing a (meth) acrylic group-containing polymer containing amino groups prepared from polymerizing a mixture of ethylenically unsaturated monomers comprising at least 10% by weight of a (meth)acrylic monomer containing hydroxy ester groups, the % by weight being based on total weight of ethylenically unsaturated monomers; (b) providing a guanidine or a guanidine reaction product or the amine salt thereof; (c) mixing (a) with (b) to form a mixture; and (d) acidifying the mixture.

Method of Coating a Substrate

The electrodepositable coating composition disclosed herein can be applied onto a number of substrates. Accordingly, the present invention is further directed to a substrate that is coated, at least in part, with the electrodepositable coating composition described herein. It will be understood that the electrocoating coating composition can be applied onto a substrate as a monocoat or as a coating layer in a multi-layer coating composite. Non-limiting examples of a suitable substrate can include a metal, a metal alloy, and/or a substrate that has been metallized such as nickel plated plastic. For example, the metal or metal alloy can include aluminum and/or steel. In one embodiment, the steel could be cold rolled steel, electrogalvanized steel, and hot dipped galvanized steel. In one embodiment, at least a portion of the surface of the metallic surface onto which the coating is applied is pretreated with phosphate, such as zinc phosphate. In certain embodiments, the coated substrate may comprise a portion of a vehicle such as a vehicular body (e.g., without limitation, door, body panel, trunk deck lid, roof panel, hood, and/or roof) and/or a vehicular frame. As used herein, the term "vehicle" or variations thereof includes, but is not limited, to civilian, commercial, and military land vehicles such as cars and trucks.

Moreover, the electrodepositable coating composition of the present invention may be applied onto the substrate to impart a wide variety of properties such as, but not limited to, corrosion resistance, chip resistance, filling (i.e., ability to hide underlying substrate roughness), abrasion resistance, impact damage, flame and/or heat resistance, chemical resistance, UV light resistance, and/or structural integrity.

Depending on the substrate, the electrodepositable coating composition is applied (i.e., electrodeposited) onto a substrate using a voltage that can range from 1 volt to several thousand volts. In one embodiment, the voltage that is used ranges from 50 volts to 500 volts. Moreover, in one embodiment, the current density is usually between 0.5 ampere and 5 amperes per square foot. It will be understood, however, that the current density tends to decrease during electrodeposition which is an indication of the formation of an insulating film.

After the coating has been applied onto the substrate via electrodeposition, in one embodiment, the coating is cured by baking the substrate at an elevated temperature ranging from 325° F. to 475° F. for a time period ranging from 15 minutes to 45 minutes.

Illustrating the invention are the following examples that are not to be considered as limiting the invention to their details. All parts and percentages in the examples, as well as throughout the specification, are by weight unless otherwise indicated.

EXAMPLES

Example 1: Synthesis of a Cationic Epoxy Adduct Made With Acidified TBD and Dispersed in Aqueous Medium

| Charge | Chemical | Weight |
|---|---|---|
| 1 | Epon 828[1] | 614.98 |
|   | Bisphenol A | 273.73 |
|   | MACOL 98B[2] | 39.63 |
|   | Methylisobutyl Ketone (mibk) | 28.70 |
|   | Ethyltriphenyl phosphonium iodide | 0.60 |
| 2 | MACOL 98B[2] | 20.00 |
|   | Methylisobutyl Ketone (MIBK) | 64.05 |
| 3 | TBD (prepared as in Example 1 of US Publication No. 2009/0286978) | 364.70 |
|   | Ketimine[3] | 78.06 |
| 4 | Epon 828[1] | 12.59 |
| 5 | 90% Formic Acid | 47.24 |
|   | Water | 768.85 |
| 6 | Water | 1034.41 |
| 7 | Water | 1058.82 |

[1]Epoxy resin available from Hexion Specialty Chemicals
[2]Bisphenol A ethylene oxide adduct available from BASF Corporation
[3]Diketimine of diethylene triamine at 72.7% in MIBK Preparation of Example 1

Charge 1 was added to a 4-necked flask fitted with a thermocouple, nitrogen sparge, and a mechanical stirrer. Under an $N_2$ blanket and agitation, the flask was heated to 135° C. The mixture exothermed to 150° C. The temperature was allowed to drop to 145° C. and held for 2 hour at this temperature. Charge 2 was then added. Charge 3 was added and the mixture was held at 120° C. for 1 hour. Charge 4 was then added and stirred for 30 min. After the hold time, the reaction mixture was poured into a solution of charge 5. Charge 6 was then added over ~30 min and stirred further for 30 min. Charge 7 was then added and mixed well. About 1000 parts of pater and solvent were distilled off under vacuum at 60-65° C.

The resulting aqueous dispersion had a solids content of 24.63%. GPC analysis was used to determine weight average ($M_w$) molecular weight of 16,208.

Example 2: Synthesis of Cationic Epoxy Adduct Made With TBD and Acidified

| Charge | Chemical | Weight |
|---|---|---|
| 1 | Epon 828 | 376.00 |
|   | Bisphenol A | 158.95 |
|   | 2-Butoxyethanol (Butyl Cellosolve) | 108.21 |
|   | Ethyltriphenyl phosphonium iodide | 0.60 |
| 2 | Butyl Cellosolve | 70.7 |
| 3 | TBD (prepared as in Example 6 of U.S. patent application No. 13/455,651) | 290.72 |
| 4 | Acetic Acid | 39.16 |

Preparation of Example 2

Charge 1 was added to a 4-necked flask fitted with a thermocouple, nitrogen sparge, and a mechanical stirrer. Under an $N_2$ blanket and agitation, the flask was heated to 135° C. The mixture exothermed to 160° C. The temperature was allowed to drop to 145° C. and held for 1 hour at this temperature. Then Charge 2 was added. Charge 3 was added and the mixture was held at 110° C. for 1 hour. Charge 4 then was added and fully mixed.

The reaction product yielded a solution with a solids percent of 78.84%. GPC analysis was used to determine $M_w$ of 6,392.

Example 3: Synthesis of Epoxy Adduct Made With N-Methyl Ethanolamine and Acidified

| Charge | Chemical | Weight |
|---|---|---|
| 1 | Epon 828 | 376.00 |
|   | Bisphenol A | 158.95 |
|   | Butyl Cellosolve | 10.92 |
|   | Ethyltriphenyl phosphonium iodide | 0.60 |
| 2 | Butyl Cellosolve | 78.31 |
| 3 | N-methyl ethanolamine | 45.43 |
| 4 | Acetic Acid | 38.16 |
| 5 | MACOL 98B | 179.80 |
|   | Butyl Cellosolve | 110.50 |

Preparation of Example 3

Charge 1 was added to a 4-necked flask fitted with a thermocouple, nitrogen sparge, and a mechanical stirrer.

Under an $N_2$ blanket and agitation, the flask was heated to 135° C. The mixture exothermed to 157° C. The temperature was allowed to drop to 145° C. and held for 1 hour at this temperature. Charge 2 then was added. Charge 3 was added and the mixture was held at 110° C. for 1 hour. Charge 4 then was added and stirred for 10 min. Charge 4 then was added and stirred until fully mixed.

The reaction product yielded a solution with a solids percent of 77.02%. GPC analysis was used to determine $M_w$ of 6,588.

Example 4: Synthesis of Epoxy Adduct Made With TBD and Not Acidified

| Charge | Chemical | Weight |
|---|---|---|
| 1 | Epon 828 | 376.00 |
|   | Bisphenol A | 158.95 |
|   | Butyl Cellosolve | 110.58 |
|   | Ethyltriphenyl phosphonium iodide | 0.60 |
| 2 | Butyl Cellosolve | 110.58 |
| 3 | TBD of Example 2 | 290.72 |

Preparation of Example 4

Charge 1 was added to a 4-necked flask fitted with a thermocouple, nitrogen sparge, and a mechanical stirrer. Under an $N_2$ blanket and agitation, the flask was heated to 135° C. The mixture exothermed to 157° C. The temperature was allowed to drop to 145° C. and held for 1 hour at this temperature. Charge 2 then was added. Charge 3 was added and the mixture was held at 110° C. for 1 hour.

The reaction product yielded a solution with a solids percent of 78.91%. GPC analysis was used to determine $M_w$ of 6437.

Example 5: Synthesis of Acrylic Resin 1 Containing 11% Hydroxypropyl Methacrylate and Acidified TBD Reaction Product Catalyst

| Charge | Chemical | Weight |
|---|---|---|
| 1 | Dowanol PPH[1] | 13.4 |
|   | Butyl Cellosolve | 12.6 |
|   | Tinuvin 1130[2] | 6.0 |
|   | Tinuvin 123[3] | 6.0 |
|   | Irganox 1010[4] | 1.1 |
| 2 | Butyl acrylate | 90.8 (37%) |
|   | Hydroxypropyl methacrylate | 26.3 (11%) |
|   | Methyl methacrylate | 85.6 (35%) |
|   | Styrene | 0.4 (0%) |
|   | Glycidyl methacrylate | 35.8 (15%) |
|   | Alpha-methyl styrene dimer | 3.4 (1%) |
| 3 | Lupersol 555[5] | 7.6 |
|   | Dowanol PPH | 3.8 |
|   | Dowanol PM[6] | 4.6 |
| 4 | Lupersol 555 | 3.2 |
|   | Dowanol PPH | 1.9 |
|   | Dowanol PM | 4.6 |
| 5 | Methylethanolamine | 17.6 |
|   | Bis(2-ethylhexyl)amine | 2.3 |
| 6 | Butyl carbitol formal[7] | 2.3 |
| 7 | Formic acid | 7.9 |
| 8 | TBD Reaction Product of Example 1 | 294.4 |
|   | Deionized water | 470.0 |
| 9 | Deionized water | 445.2 |

[1]1-phenoxy-2-propanol from The Dow Chemical Company
[2]UV absorber from BASF Corp.
[3]Hindered amine light stabilizer from BASF Corp.
[4]Antioxidant from BASF Corp.
[5]t-amyl peroxyacetate from Arkema Inc.
[6]Propylene glycol monoether from The Dow Chemical Company
[7]MAZON 1651 from BASF Corp.

Preparation of Example 5

Charge 1 was added to a 4-necked flask fitted with a thermocouple, nitrogen sparge, and a mechanical stirrer. Under an $N_2$ blanket and agitation, the flask was heated to reflux with a temperature setpoint of 142-145° C. Charges 2 and 3 were added dropwise from an addition funnel over 150 minutes followed by a 30 minute hold. Half of charge 4 was subsequently added over 5 minutes followed by a 30 minute hold. The remainder of charge 4 was added, followed by a 30 minute hold. After adjusting the temperature to 110° C., charge 5 was added and held for 90 minutes at 120° C. After the hold, a temperature was established at 100° C. Charges 6 and 7 were added and held for 20 minutes. The resin was then dispersed into Charge 8 at room temperature. After holding for 60 minutes, Charge 9 was added and allowed to cool to ambient temperature.

The dispersion yielded a solids percent of 24.4%. GPC analysis was used to determine $M_w$ of 23,928.

Example 6: Synthesis of Acrylic Resin 2 Containing 35% Hydroxypropyl Methacrylate and Acidified TBD Reaction Product Catalyst

| Charge | Chemical | Weight |
|---|---|---|
| 1 | Dowanol PPH | 13.4 |
|   | Butyl Cellosolve | 12.6 |
|   | Tinuvin 1130 | 6.0 |
|   | Tinuvin 123 | 6.0 |
|   | Irganox 1010 | 1.1 |
| 2 | Butyl acrylate | 91.1 (37%) |
|   | Hydroxypropyl methacrylate | 83.9 (35%) |
|   | Methyl methacrylate | 28.4 (12%) |
|   | Styrene | 0.4 (0%) |
|   | Glycidyl methacrylate | 35.9 (15%) |
|   | Alpha-methyl styrene dimer | 3.4 (1%) |
| 3 | Lupersol 555 | 7.7 |
|   | Dowanol PPH | 3.8 |
|   | Dowanol PM | 4.6 |
| 4 | Lupersol 555 | 3.2 |
|   | Dowanol PPH | 1.9 |
|   | Dowanol PM | 4.6 |
| 5 | Methylethanolamine | 17.6 |
|   | Bis(2-ethylhexyl)amine | 2.4 |
| 6 | Butyl carbitol formal | 2.3 |
|   | TBD Reaction Product of Example 2 | 55.4 |
| 7 | Formic acid | 7.3 |
| 8 | Deionized water | 468.2 |
| 9 | Deionized water | 604.8 |

Preparation of Example 6

Charge 1 was added to a 4-necked flask fitted with a thermocouple, nitrogen sparge, and a mechanical stirrer. Under an $N_2$ blanket and agitation, the flask was heated to reflux with a temperature setpoint of 142-145° C. Charges 2 and 3 were added dropwise from an addition funnel over 150 minutes followed by a 30 minute hold. Half of Charge 4 was subsequently added over 5 minutes followed by a 30 minute hold. The remainder of Charge 4 was added, followed by a 30 minute hold. After adjusting the temperature to 110° C., Charge 5 was added and held for 90 minutes at 120° C. After the hold, a temperature was established at 100° C. Charges 6 and 7 were added and held for 15 minutes. The resin then was dispersed into Charge 8 at room temperature. After holding for 60 minutes, Charge 9 was added and allowed to cool to ambient temperature.

The dispersion yielded a solids percent of 21.0%. GPC analysis was used to determine $M_w$ of 17,922.

Example 7: Synthesis of Acrylic Resin 3 Containing 35% of Hydroxypropyl Methacrylate and Acidified TBD Reaction Product Catalyst and Blocked Isocyanate Crosslinker

| Charge | Chemical | Weight |
|---|---|---|
| 1 | Dowanol PPH | 13.4 |
|   | Butyl Cellosolve | 12.6 |
|   | Tinuvin 1130 | 6.0 |
|   | Tinuvin 123 | 6.0 |
|   | Irganox 1010 | 1.1 |
| 2 | Butyl acrylate | 91.1 (37%) |
|   | Hydroxypropyl methacrylate | 83.8 (35%) |
|   | Methyl methacrylate | 28.3 (12%) |
|   | Styrene | 0.4 (0%) |
|   | Glycidyl methacrylate | 35.9 (15%) |
|   | Alpha-methyl styrene dimer | 3.4 (1%) |
| 3 | Lupersol 555 | 7.7 |
|   | Dowanol PPH | 3.8 |
|   | Dowanol PM | 4.6 |
| 4 | Lupersol 555 | 3.2 |
|   | Dowanol PPH | 1.9 |
|   | Dowanol PM | 4.6 |
| 5 | Methylethanolamine | 17.6 |
|   | Bis(2-ethylhexyl)amine | 2.3 |
| 6 | Butyl carbitol formal | 2.3 |
|   | TBD Reaction Product of Example 2 | 79.6 |
|   | Blocked isocyanate crosslinker[1] | 114.2 |
| 7 | Formic acid | 6.9 |
| 8 | Deionized water | 513.0 |
| 9 | Deionized water | 732.6 |

[1]Isophorone diisocyanate (IPDI) reacted with trimethylol propane (TMP) and methyl ethyl ketoxime (MEKO) at an equivalence of 10:5:5 (IPDI:TMP:MEKO)

Preparation of Example 7

Charge 1 was added to a 4-necked flask fitted with a thermocouple, nitrogen sparge, and a mechanical stirrer. Under an $N_2$ blanket and agitation, the flask was heated to reflux with a temperature setpoint of 142-145° C. Charges 2 and 3 were added dropwise from an addition funnel over 150 minutes followed by a 30 minute hold. Half of Charge 4 subsequently was added over 5 minutes followed by a 30 minute hold. The remainder of Charge 4 was added, followed by a 30 minute hold. After adjusting the temperature to 110° C., Charge 5 was added and held for 90 minutes at 120° C. After the hold, a temperature was established at 100° C. Charges 6 and 7 were added and held for 15 minutes. The resin then was dispersed into Charge 8 at room temperature. After holding for 60 minutes, Charge 9 was added and allowed to cool to ambient temperature.

The dispersion yielded a solids percent of 23.2%. GPC analysis was used to determine $M_w$ of 20,949.

Example 8: Synthesis of Acrylic Resin 4 Containing 35% Hydroxypropyl Methacrylate and Blocked Isocyanate Crosslinker and No TBD Catalyst

| Charge | Chemical | Weight |
|---|---|---|
| 1 | Dowanol PPH | 13.4 |
|   | Butyl Cellosolve | 12.6 |
|   | Tinuvin 1130 | 6.0 |
|   | Tinuvin 123 | 6.0 |
|   | Irganox 1010 | 1.1 |
| 2 | Butyl acrylate | 91.1 (37%) |
|   | Hydroxypropyl methacrylate | 83.8 (35%) |
|   | Methyl methacrylate | 28.3 (12%) |
|   | Styrene | 0.4 (0%) |
|   | Glycidyl methacrylate | 35.9 (15%) |
|   | Alpha-methyl styrene dimer | 3.4 (1%) |
| 3 | Lupersol 555 | 7.7 |
|   | Dowanol PPH | 3.8 |
|   | Dowanol PM | 4.6 |
| 4 | Lupersol 555 | 3.2 |
|   | Dowanol PPH | 1.9 |
|   | Dowanol PM | 4.6 |
| 5 | Methylethanolamine | 17.6 |
|   | Bis(2-ethylhexyl)amine | 2.3 |
| 6 | Butyl carbitol formal | 2.3 |
|   | Blocked isocyanate crosslinker of Example 7 | 114.2 |
| 7 | Formic acid | 7.9 |
| 8 | Deionized water | 437.0 |
| 9 | Deionized water | 624.1 |

Preparation of Example 8

Charge 1 was added to a 4-necked flask fitted with a thermocouple, nitrogen sparge, and a mechanical stirrer. Under an $N_2$ blanket and agitation, the flask was heated to reflux with a temperature setpoint of 142-145° C. Charges 2 and 3 were added dropwise from an addition funnel over 150 minutes followed by a 30 minute hold. Half of Charge 4 subsequently was added over 5 minutes followed by a 30 minute hold. The remainder of Charge 4 was added, followed by a 30 minute hold. After adjusting the temperature to 110° C., Charge 5 was added and held for 90 minutes at 120° C. After the hold, a temperature was established at 100° C. Charge 6 was added and held for 15 minutes. Charge 7 subsequently was added and held for 15 minutes. The resin then was dispersed into Charge 8 at room temperature. After holding for 60 minutes, Charge 9 was added and allowed to cool to ambient temperature.

The dispersion yielded a solids percent of 23.5%. GPC analysis was used to determine $M_w$ of 22,899.

Example 9: Synthesis of Acrylic Resin 5 Containing 35% Hydroxypropyl Methacrylate and Blocked Isocyanate Crosslinker, Catalyst for Isocyanate Crosslinker and No TBD Catalyst

| Charge | Chemical | Weight |
|---|---|---|
| 1 | Dowanol PPH | 13.4 |
|   | Butyl Cellosolve | 12.6 |
|   | Tinuvin 1130 | 6.0 |
|   | Tinuvin 123 | 6.0 |
|   | Irganox 1010 | 1.1 |
| 2 | Butyl acrylate | 91.0 (37%) |
|   | Hydroxypropyl methacrylate | 83.8 (35%) |
|   | Methyl methacrylate | 28.3 (12%) |
|   | Styrene | 0.4 (0%) |
|   | Glycidyl methacrylate | 35.9 (15%) |
|   | Alpha-methyl styrene dimer | 3.4 (1%) |
| 3 | Lupersol 555 | 7.7 |
|   | Dowanol PPH | 3.8 |
|   | Dowanol PM | 4.6 |
| 4 | Lupersol 555 | 3.2 |
|   | Dowanol PPH | 1.9 |
|   | Dowanol PM | 4.6 |
| 5 | Methylethanolamine | 17.6 |
|   | Bis(2-ethylhexyl)amine | 2.3 |
| 6 | Butyl carbitol formal | 2.3 |
|   | Blocked isocyanate crosslinker | 114.2 |
| 7 | Formic acid | 7.9 |
|   | Dibutyltin diacetate | 2.5 |
| 8 | Deionized water | 440.8 |
| 9 | Deionized water | 628.5 |

Preparation of Example 9

Charge 1 was added to a 4-necked flask fitted with a thermocouple, nitrogen sparge, and a mechanical stirrer. Under an $N_2$ blanket and agitation, the flask was heated to reflux with a temperature setpoint of 142-145° C. Charges 2 and 3 were added dropwise from an addition funnel over 150 minutes followed by a 30 minute hold. Half of Charge 4 subsequently was added over 5 minutes followed by a 30 minute hold. The remainder of Charge 4 was added, followed by a 30 minute hold. After adjusting the temperature to 110° C., Charge 5 was added and held for 90 minutes at 120° C. After the hold, a temperature was established at 100° C. Charge 6 was added and held for 15 minutes. Charge 7 subsequently was added and held for 15 minutes. The resin was then dispersed into Charge 8 at room temperature. After holding for 60 minutes, Charge 9 was added and allowed to cool to ambient temperature.

The dispersion yielded a solids percent of 22.7%. GPC analysis was used to determine $M_w$ of 23,904.

Example 10: Synthesis of Acrylic Resin 6 Containing 35% Hydroxypropyl Methacrylate and No TBD Catalyst

| Charge | Chemical | Weight |
|---|---|---|
| 1 | Dowanol PPH | 13.4 |
|   | Butyl Cellosolve | 12.6 |
|   | Tinuvin 1130 | 6.0 |
|   | Tinuvin 123 | 6.0 |
|   | Irganox 1010 | 1.1 |
| 2 | Butyl acrylate | 91.1 (37%) |
|   | Hydroxypropyl methacrylate | 83.8 (35%) |
|   | Methyl methacrylate | 28.3 (12%) |
|   | Styrene | 0.4 (0%) |
|   | Glycidyl methacrylate | 35.9 (15%) |
|   | Alpha-methyl styrene dimer | 3.4 (1%) |
| 3 | Lupersol 555 | 7.7 |
|   | Dowanol PPH | 3.8 |
|   | Dowanol PM | 4.6 |
| 4 | Lupersol 555 | 3.2 |
|   | Dowanol PPH | 1.9 |
|   | Dowanol PM | 4.6 |
| 5 | Methylethanolamine | 17.6 |
|   | Bis(2-ethylhexyl)amine | 2.3 |
| 6 | Butyl carbitol formal | 2.3 |
|   | Non-catalytic adduct of Example 3 | 68.6 |
| 7 | Formic acid | 7.5 |
| 8 | Deionized water | 454.3 |
| 9 | Deionized water | 603.9 |

Preparation of Example 10

Charge 1 was added to a 4-necked flask fitted with a thermocouple, nitrogen sparge, and a mechanical stirrer. Under an $N_2$ blanket and agitation, the flask was heated to reflux with a temperature setpoint of 142-145° C. Charges 2 and 3 were added dropwise from an addition funnel over 150 minutes followed by a 30 minute hold. Half of Charge 4 was subsequently added over 5 minutes followed by a 30 minute hold. The remainder of Charge 4 was added, followed by a 30 minute hold. After adjusting the temperature to 110° C., Charge 5 was added and held for 90 minutes at 120° C. After the hold, a temperature was established at 100° C. Charges 6 and 7 were added and held for 15 minutes. The resin then was dispersed into Charge 8 at room temperature. After holding for 60 minutes, Charge 9 was added and allowed to cool to ambient temperature.

The dispersion yielded a solids percent of 21.6%. GPC analysis was used to determine $M_w$ of 21,833.

Example 11: Synthesis of Acrylic Resin 7 Containing 35% Hydroxypropyl Methacrylate and Non-Acidified TBD Reaction Product Catalyst

| Charge | Chemical | Weight |
|---|---|---|
| 1 | Dowanol PPH | 13.4 |
|   | Butyl Cellosolve | 12.6 |
|   | Tinuvin 1130 | 6.0 |
|   | Tinuvin 123 | 6.0 |
|   | Irganox 1010 | 1.1 |
| 2 | Butyl acrylate | 91.1 (37%) |
|   | Hydroxypropyl methacrylate | 83.8 (35%) |
|   | Methyl methacrylate | 28.3 (12%) |
|   | Styrene | 0.4 (0%) |
|   | Glycidyl methacrylate | 35.9 (15%) |
|   | Alpha-methyl styrene dimer | 3.4 (1%) |
| 3 | Lupersol 555 | 7.7 |
|   | Dowanol PPH | 3.8 |
|   | Dowanol PM | 4.6 |
| 4 | Lupersol 555 | 3.2 |
|   | Dowanol PPH | 1.9 |
|   | Dowanol PM | 4.6 |

-continued

| Charge | Chemical | Weight |
|---|---|---|
| 5 | Methylethanolamine | 17.6 |
|   | Bis(2-ethylhexyl)amine | 2.3 |
| 6 | Butyl carbitol formal | 2.3 |
|   | Non-acidified metal-free catalyst adduct of Example 4 | 62.5 |
| 7 | Formic acid | 6.9 |
|   | Deionized water | 452.2 |
| 8 | Deionized water | 598.4 |

Preparation of Example 11

Charge 1 was added to a 4-necked flask fitted with a thermocouple, nitrogen sparge, and a mechanical stirrer. Under an $N_2$ blanket and agitation, the flask was heated to reflux with a temperature setpoint of 142-145° C. Charges 2 and 3 were added dropwise from an addition funnel over 150 minutes followed by a 30 minute hold. Half of Charge 4 subsequently was added over 5 minutes followed by a 30 minute hold. The remainder of Charge 4 was added, followed by a 30 minute hold. After adjusting the temperature to 110° C., Charge 5 was added and held for 90 minutes at 120° C. After the hold, a temperature was established at 100° C. Charge 6 was added and held for 15 minutes. The resin then was dispersed into Charge 7 at room temperature. After holding for 60 minutes, Charge 8 was added and allowed to cool to ambient temperature.

The dispersion yielded a solids percent of 23.2%. GPC analysis was used to determine $M_w$ of 20,949. The dispersion phase separated on standing.

Example 12: Formulation of Acrylic Paint A

|   | Material | Weight (g) |
|---|---|---|
| 1 | Acrylic resin 1 (11% hydroxypropyl methacrylate and acidified TBD catalyst) | 1326.1 |
| 2 | CP818[1] | 67.7 |
| 3 | Deionized water | 906.2 |

[1]Cationic paste commercially available from PPG Industries, Inc.

Preparation of Example 12

Charge 1 was added to a one gallon container, diluted with a portion of Charge 3, and then placed under agitation. Charge 2 was diluted with a portion of Charge 3 and added to the diluted Charge 1. The remainder of Charge 3 then was added.

Example 13: Formulation of Acrylic Paint B

|   | Material | Weight (g) |
|---|---|---|
| 1 | Acrylic resin 2 (35% hydroxypropyl methacrylate and acidified reaction product catalyst) | 1595.1 |
| 2 | CP549[2] | 22.2 |
| 3 | Deionized water | 682.7 |

[2]Cationic tin free paste available from PPG Industries, Inc.

Preparation of Example 13

Charge 1 was added to a one gallon container, diluted with a portion of Charge 3, and then placed under agitation. Charge 2 was diluted with a portion of Charge 3 and added to the diluted Charge 1. The remainder of Charge 3 then was added.

Example 14: Formulation of Acrylic Paint C

|   | Material | Weight (g) |
|---|---|---|
| 1 | Acrylic resin 3 (35% hydroxypropyl methacrylate, TBD catalyst, and blocked isocyanate crosslinker) | 948.3 |
| 2 | Deionized water | 1251.7 |

Preparation of Example 14

Charge 1 was added to a one gallon container, diluted with Charge 2, and agitated prior to use.

Example 15: Formulation of Acrylic Paint D

|   | Material | Weight (g) |
|---|---|---|
| 1 | Acrylic resin 4 (35% hydroxypropyl methacrylate, blocked isocyanate crosslinker, and no TBD catalyst) | 936.2 |
| 2 | Deionized water | 1263.8 |

Preparation of Example 15

Charge 1 was added to a one gallon container, diluted with Charge 2, and agitated prior to use.

Example 16: Formulation of Acrylic Paint E

|   | Material | Weight (g) |
|---|---|---|
| 1 | Acrylic resin 5 (35% hydroxypropyl methacrylate, blocked isocyanate crosslinker, catalyst for isocyanate crosslinker, and no TBD catalyst) | 969.2 |
| 2 | Deionized water | 1230.8 |

Preparation of Example 16

Charge 1 was added to a one gallon container, diluted with Charge 2, and agitated prior to use.

Example 17: Formulation of Acrylic Paint F

|   | Material | Weight (g) |
|---|---|---|
| 1 | Acrylic resin 6 (35% hydroxypropyl methacrylate and no TBD catalyst) | 1527.8 |
| 2 | Deionized water | 672.2 |

Preparation of Example 17

Charge 1 was added to a one gallon container, diluted with Charge 2, and agitated prior to use.

Example 18: Coating Conditions for a Full 4"×6" ACT Test Panel[3]

| Example | Bath Temperature[4] | Voltage | Coating Time[5] |
|---|---|---|---|
| Paint A | 80 | 150 | 120 |
| Paint B | 80 | 75 | 120 |
| Paint C | 80 | 200 | 120 |
| Paint D | 80 | 120 | 120 |
| Paint E | 80 | 120 | 120 |
| Paint F | 80 | 65 | 120 |

[3]All panels are cold rolled steel with zinc phosphate pretreatment and deionized water post rinse.
[4]Measured in degrees Fahrenheit.
[5]Measured in seconds.

Example 19: Cure Testing Results[6] in a Direct Fire Gas Oven

| | Curing Temperatures[7] | | | |
|---|---|---|---|---|
| Example | 375° F. | 400° F. | 425° F. | 450° F. |
| Paint A[8] | 22 - break to metal | 58 - break to metal | 100 - Moderate Mar | 100 - Moderate Mar |
| Paint B[8] | 45 - break to metal | 100 - No Mar | 100 - No Mar | |
| Paint C[9] | 80 - break to metal | 100 - slight to very slight mar | 100 - No Mar | |
| Paint D[9] | 25 - break to metal | 35 - break to metal | 100 - Moderate Mar | 100 - Very Slight Mar |
| Paint E[9] | 50 - break to metal | 60 - break to metal | 100 - Very Slight Mar | 100 - Very Slight Mar |
| Paint F[8] | No cure | No cure | 10 - break to metal | |

[6]Cure testing is completed by measuring the amount of mar after 100 double acetone. If the coating breaks to metal prior to reaching 100 double acetone rubs, the amount of double rubs that it took to break to metal is recorded.
[7]Curing temperatures are measured in degrees Fahrenheit.
[8]The acrylic resins used to make these paints do not contain any urethane crosslinker.
[9]The resins used to make these paint contain urethane crosslinker.

The experimental results show the importance of having at least 25% by weight of a (meth)acrylic monomer containing at least 10% by weight of a β-hydroxy ester group (Paint A and Paint B); of using an acidified TBD catalyst in the preparation of the acrylic polymer aqueous dispersion (Example 11 and Paint B); the advantage of using both TBD and blocked isocyanate curing without the need for metal (tin catalyst) (Paint C, Paint D, Paint E); and the catalytic effect of TBD reaction product compared to similar reaction product without TBD (Paint B and Paint F).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrodepositable coating composition comprising:
(a) a cationic amine salt group-containing (meth)acrylate polymer prepared by polymerizing a mixture of ethylenically unsaturated monomers comprising at least 10% by weight of a (meth)acrylate monomer containing hydroxy alkyl groups and at least 2% by weight of a 1,2-epoxy group-containing monomer to form a (meth)acrylate polymer, the % by weight being based on total weight of the mixture of ethylenically unsaturated monomers, and further reacting the (meth)acrylate polymer with an amine to ring open the 1,2-epoxy group followed by at least partial neutralization with acid to form the cationic amine salt group-containing (meth)acrylate polymer; and
(b) an acid salt of a guanidine or an acid salt of a guanidine reaction product;
wherein the cationic amine salt group-containing (meth) acrylate polymer is prepared in the presence of (b), and the electrodepositable coating composition is cured by a transesterification curing mechanism and does not contain a crosslinker.

2. The electrodepositable coating composition of claim 1, wherein the hydroxy alkyl groups comprise β-hydroxy alkyl groups.

3. The electrodepositable coating composition of claim 1, wherein the 1,2-epoxy group-containing monomer is glycidyl (meth)acrylate.

4. The electrodepositable coating composition of claim 1, wherein (b) is an acid salt of a guanidine reaction product of a guanidine and a polyepoxide.

5. The electrodepositable coating composition of claim 4, wherein the polyepoxide is a polyglycidyl of a polyphenol.

6. The electrodepositable coating composition of claim 5, wherein the polyphenol is bisphenol A.

7. The electrodepositable coating composition according to claim 1, wherein said cationic amine salt group-containing (meth)acrylate polymer has a weight average molecular weight from 5,000 to 100,000.

8. The electrodepositable coating composition according to claim 1, wherein (b) comprises at least 0.1% by weight of guanidine based on resin solids weight of (a) plus (b).

9. The electrodepositable coating composition according to claim 1, wherein (b) is an acid salt of a cyclic guanidine comprising structure (II), structure (III), structure (IV) and/or structure (V), or an acid salt of reaction products of the cyclic guanidine comprising structure (II), structure (III), structure (IV) and/or structure (V):

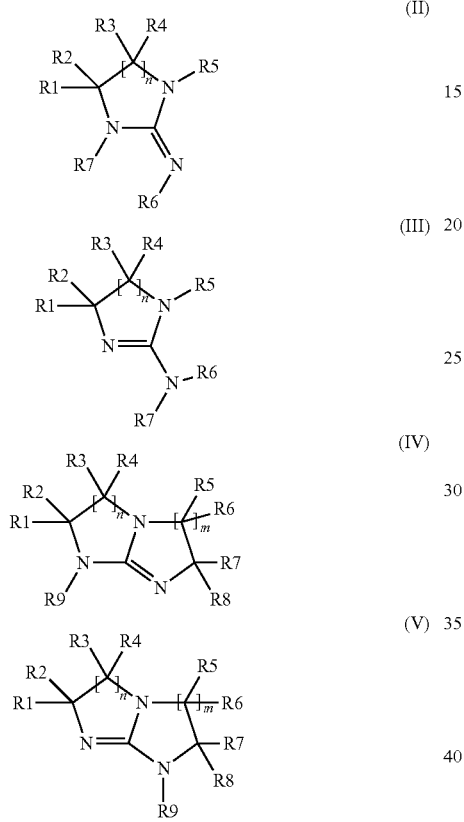

wherein each of R1, R2, R3, R4, R5, R6, R7, R8, or R9 comprises hydrogen, (cyclo)alkyl, aryl, aromatic, organometallic, a polymeric structure, or together can form a cycloalkyl, aryl, or an aromatic structure, and wherein R1, R2, R3, R4, R5, R6, R7, R8, and R9 can be the same or different, and wherein n and m are both >1, and wherein n and m may be the same or different.

10. The electrodepositable coating composition according to claim 1, wherein (b) comprises an acid salt of 1,5,7-triazabicyclo[4.4.0]dec-5-ene or an acid salt of reaction products of 1,5,7-triazabicyclo[4.4.0]dec-5-ene.

11. The electrodepositable coating composition of claim 1, wherein the mixture of ethylenically unsaturated monomers comprises at least 25% by weight of a (meth)acrylate monomer containing hydroxy alkyl groups, the % by weight being based on total weight of the mixture of ethylenically unsaturated monomers.

12. A method of preparing the electrodepositable coating composition of claim 1, the method comprising:
 (a) providing an amino group-containing (meth)acrylate polymer prepared from polymerizing a mixture of ethylenically unsaturated monomers comprising at least 10% by weight of a (meth)acrylate monomer containing hydroxy alkyl groups and at least 2% by weight of a 1,2-epoxy group-containing monomer to form a (meth)acrylate polymer, the % by weight being based on total weight of the mixture of ethylenically unsaturated monomers, and further reacting the (meth)acrylate polymer with an amine to ring open the 1,2-epoxy group;
 (b) providing an acid salt of a guanidine or an acid salt of a guanidine reaction product;
 (c) mixing (a) with (b) to form a mixture; and
 (d) acidifying the mixture to at least partially neutralize the amino group-containing (meth)acrylate polymer to form a cationic amine salt group-containing (meth)acrylate polymer;
 wherein the cationic amine salt group-containing (meth)acrylate polymer is prepared in the presence of (b), and the electrodepositable coating composition is cured by a transesterification curing mechanism and does not contain a crosslinker.

13. A method for coating a substrate comprising:
 (a) introducing the substrate serving as a cathode into an electrodeposition bath comprising an aqueous dispersion of the electrodepositable coating composition of claim 1;
 (b) electrodepositing the electrodepositable coating composition onto the surface of the substrate to form a coated layer on the substrate surface; and
 (c) heating the coated layer to form a cured coating.

14. A substrate coated by the method of claim 13.

* * * * *